United States Patent
Klein et al.

(10) Patent No.: US 8,375,254 B2
(45) Date of Patent: Feb. 12, 2013

(54) FACTORIAL DESIGN EXPERT SYSTEM

(75) Inventors: Mark Klein, New Castle, NH (US);
Brian Jenkins, Portsmouth, NH (US)

(73) Assignee: Loyalty Builders, Inc., Portsmouth, NH (US)

( * ) Notice: Subject to any disclaimer, the term of this patent is extended or adjusted under 35 U.S.C. 154(b) by 747 days.

(21) Appl. No.: 11/517,174

(22) Filed: Sep. 7, 2006

(65) Prior Publication Data

US 2008/0126290 A1    May 29, 2008

(51) Int. Cl.
*G06F 11/00* (2006.01)
(52) U.S. Cl. .................... 714/47.1
(58) Field of Classification Search .......... 714/47, 714/47.1; 706/60, 45; 705/300, 7.29
See application file for complete search history.

(56) References Cited

U.S. PATENT DOCUMENTS

| | | | |
|---|---|---|---|
| 5,812,436 A * | 9/1998 | Desgrousilliers et al. | 702/108 |
| 6,625,500 B1 * | 9/2003 | Li | 700/29 |
| 6,792,393 B1 * | 9/2004 | Farel et al. | 702/186 |
| 7,308,418 B2 * | 12/2007 | Malek et al. | 705/7.32 |
| 7,930,196 B2 * | 4/2011 | Fung et al. | 705/7.37 |
| 2004/0117239 A1 * | 6/2004 | Mittal et al. | 705/10 |
| 2004/0204957 A1 * | 10/2004 | Afeyan et al. | 705/1 |
| 2004/0225972 A1 * | 11/2004 | Oeltjen et al. | 716/4 |
| 2007/0130090 A1 * | 6/2007 | Staib et al. | 705/400 |
| 2008/0065464 A1 | 3/2008 | Klein et al. | |
| 2008/0065476 A1 | 3/2008 | Klein et al. | |

* cited by examiner

*Primary Examiner* — Scott Baderman
*Assistant Examiner* — Yair Leibovich
(74) *Attorney, Agent, or Firm* — Cesari and McKenna, LLP

(57) ABSTRACT

An automated expert system that uses split-run and factorial design methods to determine which factors are most important in an experiment. The expert system is architected into Design, Execute and Evaluate phases, to assist a user in developing a Factorial Design experiment in which one, two or three factors are tested simultaneously. In a preferred embodiment, a database infrastructure and web client, browser-based methodology functions as the expert system (a "wizard") to design experiments, build control groups and evaluate results, all with the goal of discovering what values for which factors will yield the optimum response from subjects.

20 Claims, 3 Drawing Sheets

FACTORIAL DESIGN EXPERT SYSTEM

RELATED APPLICATION(S)

This application is related to U.S. patent applications Ser. No. 11/517,180 entitled "Predicting Response Rate" filed on Sep. 7, 2006 and 11/517,180 entitled "Online Direct Marketing System" filed on Sep. 7, 2006. The entire teachings of the above application(s) are incorporated herein by reference.

BACKGROUND OF THE INVENTION

The present invention is generally related to statistics, marketing, and experimental design and more particularly related to an expert system that uses split-run and factorial design methods to determine which factors are most important in an experiment.

Marketing is a process through which a company induces new and existing customers to buy its products and services. One familiar type of a marketing activity is advertising, where a company broadcasts its message to whomever is viewing the medium carrying the advertising message, for example newspapers, television, billboards, web sites, even the sides of buses. Another type of marketing activity is direct marketing, in which a company tries to address its prospects and customers individually through postal mail or email.

Targeting is the process of selecting potential buyers, perhaps for particular products or their likelihood of making a purchase in the near future or because they may be in danger of defecting, among other reasons. Properly done, targeting should also include predicting the results of the actual campaign. Testing is the process of experimenting to determine the most effective offers or the right customers to target. Campaigning involves contacting the targeted customers by appropriate media, such as email or direct mail.

Like other researchers, marketers need to carefully design experiments to effectively test marketing campaigns. For example, they may need to determine whether an optimum discount is, for example, 5% or 10% or a $10 off coupon. They typically need to determine what level of personalization is most effective, and what communications channels work best. Each of these variables are called Factors. To get the answers to questions like this, Marketers design small campaigns to test what value of each factor works best.

Historically the process has been to use a main population and a control group to measure the effect of a factor. The main population gets a campaign with value1 for factor1. Factor1 might be discount coupon rate. Value1 might be $10 off on $50 of purchases. The control group consists of a population with the same characteristics as the main group, but with a different value, value2, for the factor, for example $20 off on $100 of purchases. This simple kind of design is called A/B, Split-run, or more commonly One Factor At a Time (OFAT) design. Only one factor is changed. When OFAT design is used, several campaigns are needed to test multiple factors.

Advances in statistical analysis have led to a much improved methodology called factorial design in which several factors can be tested in the same campaign. Adoption of factorial design has been slow because tests can be difficult to design and hard to interpret, especially when the number of factors grows or partial factorial designs are used. However factorial design experiments have several advantages:

Results are obtained sooner because multiple campaigns are not needed
Costs are lower because smaller subject populations are used and fewer campaigns are launched
Interactions between factors can be measured, which is close to impossible with split-run designs

SUMMARY OF THE INVENTION

For many years, the only acceptable design for an experiment was split-run, or One Factor At a Time (OFAT). More recently, marketing researchers have recognized the validity of Factorial Design, in which multiple factors can be tested simultaneously. Testing several factors together is faster, less expensive, and reveals the interactions among the factors. However factorial design is conceptually harder to understand for experimenters not well versed in statistics, and correspondingly harder to interpret, for example, by a typical small businessperson.

To overcome these obstacles, the invention describes an expert system that is architected into Design, Execute and Evaluate phases, to assist a user in developing a Factorial Design experiment in which one, two or three factors are tested simultaneously. In a preferred embodiment, a database infrastructure and web client, browser-based methodology functions as the expert system (a "wizard") to design experiments, build control groups and evaluate results, all with the goal of discovering what values for which factors will yield the optimum response from the subjects.

More particularly, in the Design phase of the system, the user is asked a series of questions to determine what is to be tested, how many factors are involved, desired size of the test population, and information about any groups of customers that should be included or excluded from testing. Based on this information, the system then creates subgroups and assigns specific values ("treatments") for the factors in each subgroup. The test population is recorded in a database.

In the Execution phase of the system, which may be implemented in an Online Direct Marketing System, each member of a treatment subgroup receives email or direct mail with the appropriate treatment—typically an offer to buy some product or service. After a suitable period of time, transaction data is returned to the system for evaluation.

In the Measurement and Evaluation phase, the transactions from each subgroup are analyzed according to the formulae in the invention. Main effects and interaction effects are calculated. Results are presented to the experimenter in the form of a table and bar chart so the experimenter can determine which values for the various factors yield the best responses.

The user can extend the expert system using more factors in a straightforward way.

In one preferred embodiment, the expert system is part of an Online Direct Marketing System delivered over the Internet through a web client (browser). However the invention will work equally well running on a local system and dealing with experiments far afield from marketing campaigns.

The objective of this expert system is to enable relatively unsophisticated experimenters to design and execute effective experiments just by answering questions posed by the system.

While the preferred embodiment is for use in marketing experiments that include testing and targeting of customers or campaign offers, the concepts disclosed herein permit extension of the system to many other fields and types of experiments.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

The following definitions are used in this document:

Definitions

Factor—a variable to test; examples include but are not limited to collateral size, discount, extent of personalization, communications channel, etc.

Level—the number of different values for a factor; typically there are two (5% off, 10% off) or three different levels; in a two level design, the higher value is typically denoted by a plus sign (+) and the lower value is denoted by a minus sign (−) when the values are numerical; the values are not necessarily numerical Treatment—the level value delivered to a subject; for example if the factor is discount level and the level values are 5% and 10%, then those subjects offered the 10% discount are said to have been given the +treatment Control group—a subset of the subject population that is set aside for a different treatment to determine the effect of a factor; the control group can also be one of the combinations of the different treatments Recipe—the collective set of treatments given to a subject; for example in a two factor, two level design, one recipe is to give a subject the +treatment for both factors Response—what the subject does after receiving the treatment; for example the subject makes a purchase Main effect—the response result due to a particular factor Interaction effects—response results due to a combination of factors; how one factor influences another Process There are three phases to an implementation of an expert Factorial Design system according to the invention. These encompass the high level process or steps (phases) of creating, conducting, and analyzing tests, namely:

I) Creating Tests, in which the test is created and executed;

II) Data Collection, in which the results of the test are gathered and counted; and III) Evaluation, in which the collected results are analyzed and displayed.

Each of these high level phases will now be described in detail.

Phase I. Creating Tests

Figure 1:
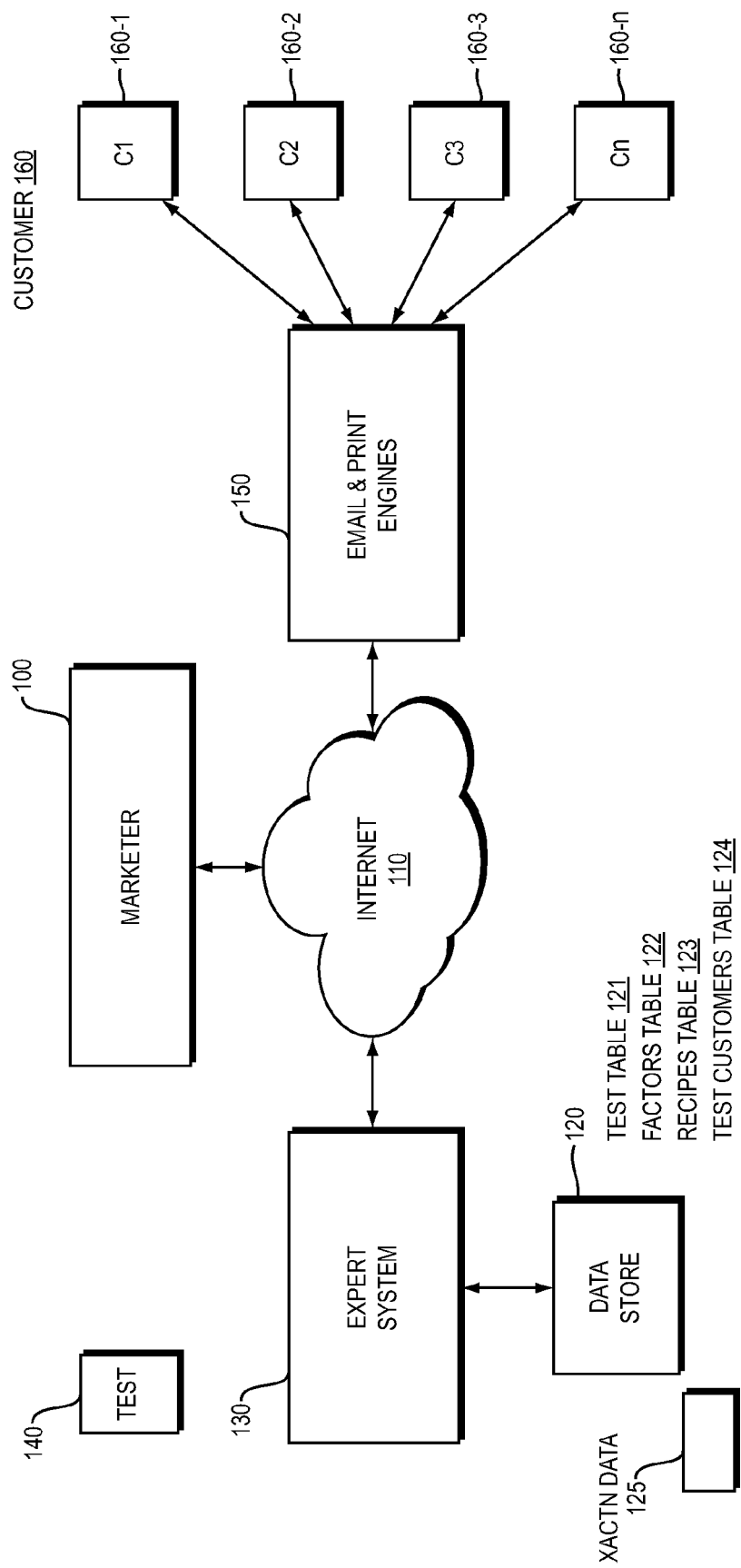
FIG. 1 is a high level diagram of a system environment in which the factorial design expert system may be implemented.

Referring to the Environment Diagram, FIG. 1, in this first phase of the process, Marketers 100 upload customer transaction data 125 via the Internet 110 to a Data Store 120. Then Marketers 100 interact via the Internet 110 with the Expert System 130 to create a test 140. The Expert System 130 uses the transaction data 125 to collect a population of customers 160 from which to extract a subset for the test. Next, the Marketer 100 interacts via a web browser with the Expert System 130 to set the parameters and filters for test groups.

Figure 2:
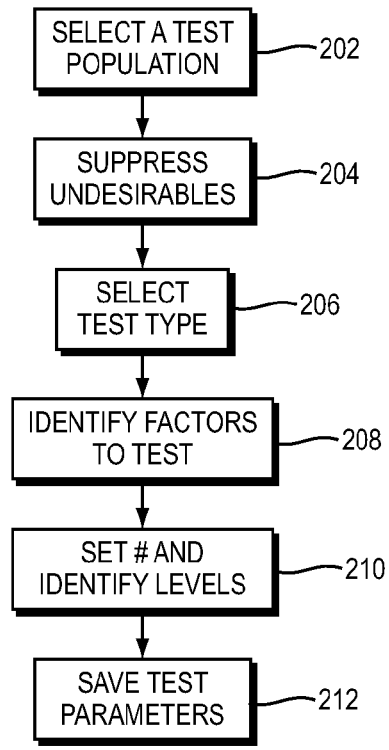
FIG. 2 is a sequence of steps performed in a Design phase.

FIG. 2 shows some of the steps performed in creating tests 140 in more detail. In step 202, a test population is selected. The test population is defined using parameters such as size and characteristics. Undesirable attributes of the population may also be determined, and such members suppressed, in step 204. Next, in step 206, the desired type of test 140 is defined by the Marketer 100. This definition may include types of offers, or types of targeting.

As part of defining the test, specific Factors to include in a test 140 are also determined in step 208. There may be a range of values (low and high) specified for each Factor in step 210; there may be up to three Factors for each test 140. Specific examples of Factors as used in the definition of a test 140 are described in more detail below in the section on the design of Data Store 120.

Finally, in step 212 the test parameters are stored. data is collected from the user that specifies the nature of the test 140, e.g., gathered through a series of questions presented in a web-client (browser) application, Answers to the questions are stored in the appropriate database tables, described below.

As described in more detail below, the test 140 creation process automatically creates as many subgroups as necessary to deploy a full factorial experimental design for the number of factors to be tested.

For example, if L is the number of levels and F is the number of factors, the number of subgroups needed is $L^F$, or L raised to the F power. When L=2 and F=3, then $2^3=8$ subgroups are needed. Subjects (Customers 160 from the test population) are randomly assigned to the subgroups by the Expert System 130.

The Marketer 100 downloads these subgroups and carries out the test campaigns in which each subgroup gets a communication that implements the recipe for that subgroup. Alternatively, the Expert System 130 itself could send the emails or printed materials via email and/or print engines 150 to customers 160.

Phase II. Data Collection

Figure 3:
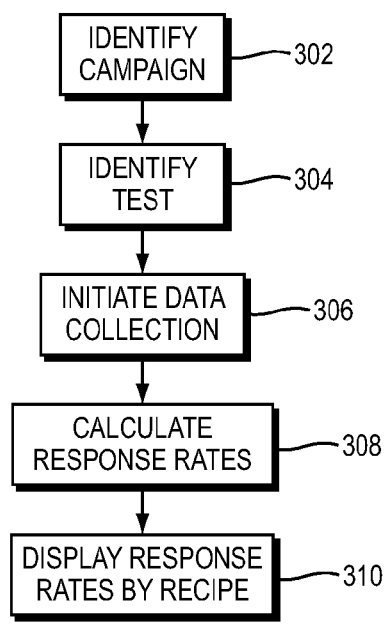
FIG. 3 is a sequence of steps performed in an Data Collection (Execution) phase.

After a suitable period of time, the Marketer 100 again collects transaction data that details which of the test campaign recipients responded in what ways, and again uploads the transaction data to the expert system. The Marketer 100 then interacts once more with the Expert System for the Data Collection phase. FIG. 3 shows the steps for this phase of the process.

For this part of the Data Collection process, the Marketer 100 identifies the campaign, in step 302, and test 140, in step 304, so the Expert System 130 knows which customers 160 are in the test population. Then the Expert System 130 collects the transaction data in step 306 from those customers for the time period defined by the test. Then, in step 308 the Expert System 130 calculates the response rates for the various recipes, which are then displayed in step 310.

Phase III. Evaluation

Figure 4:
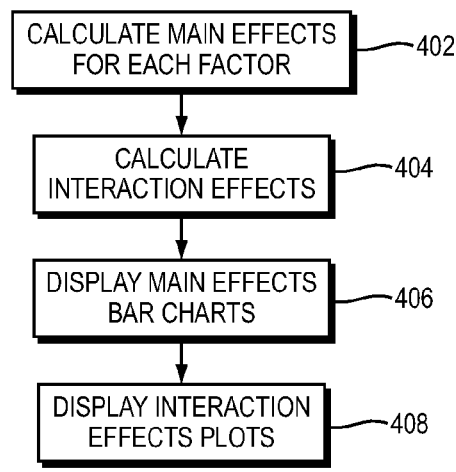
FIG. 4 is a sequence of steps performed in an Evaluation phase.

Now the Expert System 130 is ready to proceed to the Evaluation Phase, where the effects of each factor are calculated as well as the effects due to interactions between the factors. FIG. 4 shows the steps in this phase of the process.

From the response data, the main effect and the interaction effects if any are calculated in steps 402 and 404 according to the formulae described below. The main and interaction effects are presented in a table and/or as bar charts in step 406, such as in a Report section of the Expert System 130, organized according to whether the factor helps or hurts the response. After the test results are displayed, the Marketer can decide which factors are the ones to use in the full campaign, and at what levels, via an interaction in step 408.

Expert System Elements

Specific elements of the Expert System 130 are now described in more detail, including the format of Data Store 120, and how the Main Effects and Interaction Effects are determined in the Test Evaluation Phase.

Database Design for Data Store 120

The infrastructure to enable this three phase process is a database and associated SQL code. In addition to the tables used to store transactions 124, products, and customer 160 information, four more tables are used to store test parameters—Tests 121, Factors 122, Recipes 123, and Test_Customers 124. The fields for these tables are shown below.

Test Table 121
Test ID
Test Name
Number of Factors
Number of Levels
Number of subgroups
Factors Table 122
Factor ID
Factor name
Test ID
Value 1
Value 2
Value 3, with one value for each level, L=2 or 3
Recipes Table 123
RecipeID (key)
TestID
Factor1 (value would be a FactorID)
Factor2
Factor3 (used for a three factor test)
F1treatment (value is a Value1 or Value2 or Value 3 from the Factor table; thus a recipe record states what Values are associated with each Factor used, and Treatment is the term used to denote that Factor/Value combination.)
F2treatment
F3treatment
Test_Customers Table 124
Customer ID
TestID (specifies the test)
RecipeID (specifies the subgroup)
Revenue during test period
NumOrders The Test_Customers table 124 associates the treatments with the subjects (customers 160). The Test_Customers table 124 holds the customers 160 in the test, specifying in which subgroup they have been placed. This table 24 also holds the results (revenue, response) from the Test. This table 124 can be large.

For a one factor, split-run test, there is one record in the Factors table 122 for the single factor. For a two factor test, there are two records in the Factors table 122 for a given TestID; for a three factor test there are three records for the same TestID. Each factorID has as many treatment values (value1, value 2, . . . ) as there are levels in the test. Thus each test 140 is specified by the number of factors, the number of levels, and a set of recipes.

For tests 140 with one, two, or three factors, the recipes table 123 for a given testID has two, four or eight entries. Each entry describes the treatment for each factor. Recipe 1 would say factor A is +, Factor B is +. Recipe 2 would say Factor A is +, Factor B is − (all in a 2 factor design). Again for L=2, the Factors table 122 will specify the two values of the factor. For example, if the Factor is discount level, value 1 might be 5% and value 2 could be 10%. See the chart below, where + and − represent the two levels for a given factor.

| Factors/Recipes | Factor 1 | Factor 2 |
|---|---|---|
| R1 | + | + |
| R2 | + | − |
| R3 | − | + |
| R4 | − | − |

Specifically, the Recipes table 123 identifies the
recipe number for a given test
factors (e.g. discount level, personalization) using Factor ID
factor treatment for each factor (value1, value2 or value3)
For a two level, three factor design, there are eight recipes as shown in the next table.

| Recipes | Factors | | |
|---|---|---|---|
| | Factor 1 | Factor 2 | Factor 3 |
| R1 | − | − | − |
| R2 | + | − | − |
| R3 | − | + | − |
| R4 | + | + | − |
| R5 | − | − | + |
| R6 | + | − | + |
| R7 | − | + | + |
| R8 | + | + | + |

Calculating Main and Interaction Effects

A. Two Factor Design

When the test is completed, these tables (121,122,123,124) are queried to produce the test results. The object is to determine which factors have what effects on the responses. Two kinds of effects are calculated Main effects, which analyze the effects of each factor individually Interaction effects, which analyze the factors acting together Using the two factor, two level design above, values are assigned to the responses y(n) in the various cells as follows:

| | Factor1 + | Factor1 − |
|---|---|---|
| Factor2 + | y(1) (R1: + +) | y(3) (R3: − +) |
| Factor2 − | y(2) (R2: + −) | y(4) (R4: − −) |

Then the Main Effect of Factor 1 is determined by comparing all the Factor1+responses with the Factor2 responses. That is, we calculate $$ME(F1)=(y(1)+y(2)-y(3)-y(4))/2$$

Similarly, $$ME(F2)=(y(1)+y(3)-y(2)-y(4))/2$$

The Interaction Effect between F1 and F2 is $$IE(F1 \times F2)=(y(1)+y(4)-y(2)-y(3))/2$$

B. Three Factor Design

The best way to understand a three factor design is through a cube plot, where the eight responses (typically revenue) to the eight combinations (Recipes) of the three factors are plotted on the eight vertices of a cube. Calling the revenue response the yield (y), we represent the eight yields as y(1), y(2), . . . , y(8), corresponding to the eight recipes. Then $$ME(F1)=(y(2)+y(4)+y(6)+y(8)-y(1)-y(3)-y(5)-y(7))/4$$

$$ME(F2)=(y(3)+y(4)+y(7)+y(8)-y(1)-y(2)-y(5)-y(6))/4$$

$$ME(F3)=(y(5)+y(6)+y(7)+y(8)-y(1)-y(2)-y(3)-y(4))/4$$

There can be two factor interactions and three factor interactions. The two factor interactions are $$IE(F1 \times F2)=(y(1)+y(4)+y(5)+y(8)-y(2)-y(3)-y(6)-y(7))/4$$

$$IE(F1 \times F3)=(y(1)+y(3)+y(6)+y(8)-y(2)-y(4)-y(5)-y(7))/4$$

$$IE(F2 \times F3)=(y(1)+y(2)+y(7)+y(8)-y(3)-y(4)-y(5)-y(7))/4$$

The three factor interactions are more complex. Consider the F1×F2 interaction. We can examine this interaction at the + level for Factor 3 and at the − level for Factor 3. The interaction at the + level for Factor 3 is $$(y(8)-y(7)-(y(6)-y(5)))/2$$

At the − level, it is $$(y(4)-y(3)-(y(2)-y(1)))/2$$

The consistency of the F1×F2 interaction across variations in F3 is measured by 1S the difference between these two terms. Half of this difference is defined as the three factor interaction between F1, F2, and F3.

All of the factorial effects are a contrast between two averages.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for executing in a data processing environment, the method for the design of a factorial test for a marketing campaign with multiple factors as independent design variables, comprising the steps of:
   designing the factorial test, within an online expert system, using an interactive test design process such that a user designs the factorial test by interacting with the online expert system, the interactive design for the factorial test including at least a selection of test type, a test population of potential customers of the marketing campaign against which the test is to be run, and selection of at least two factors from the test population of potential customers to be used as independent design variables, wherein the factorial test includes testing multiple factors simultaneously;
   executing the factorial test within the online expert system, to determine responses by the potential customers of the marketing campaign in the test population to the multiple factors tested simultaneously; and
   automatically evaluating factorial test results within the online expert system, using predetermined formulas to calculate at least one of a main effect and interaction effect of the multiple factors.

2. The method of claim 1 wherein the step of designing the factorial test further comprises:
   choosing the at least two factors;
   setting factor levels for the at least two factors;
   choosing the test population from among a larger population;
   storing information specifying the test design in a database.

3. The method of claim 2 wherein the database further comprises an SQL database that further includes:
   a test table, having one record of descriptors per test;
   a factors table, having values for all the factors associated with all of the tests;
   a recipes table with treatments for each treatment subgroup; and
   a test_Customers table that associates treatment subgroups with the test population.

4. The method of claim 1 wherein the step of executing the factorial test further comprises:
   running the factorial test; and
   collecting results of the factorial test.

5. The method of claim 1 wherein the step of evaluating test results further comprises
   reporting the at least one of main effects and interaction effects.

6. The method of claim 2 wherein the steps of choosing factors, setting factor levels, choosing a test population, and choosing the composition of the test population are implemented via a user interacting with the online expert system via a web client accessing a server.

7. The method of claim 1 further comprising automatically creating subgroups necessary to deploy a full factorial experimental design for the at least two factors being tested.

8. The method of claim 7 wherein the number of subgroups necessary to deploy the full factorial experimental design includes a number of levels raised to the power of the number of factors.

9. The method of claim 1 wherein the main effect of the factorial test with two factors as independent design variables is determined by comparing first factor responses with second factor responses according to the following formulas:

$$ME(F1)=(y(1)+y(2)-y(3)-y(4))/2 \text{ and } ME(F2)=(y(1)+y(3)-y(2)-y(4))/2.$$

10. The method of claim 1 wherein the interaction effect of the factorial test with two factors as independent design variables between the two factors is determined according to the following formula:

$$IE(F1 \times F2)=(y(1)+y(4)-y(2)-y(3)) \times 2.$$

11. The method of claim 1 wherein the main effect of the factorial test with three factors as independent design variables is determined by comparing first factor responses with second factor responses with third factor responses according to the following formulas:

$$ME(F1)=(y(2)+y(4)+y(6)+y(8)-y(1)-y(3)-y(5)-y(7))/4$$

$$ME(F2)=(y(3)+y(4)+y(7)+y(8)-y(1)-y(2)-y(5)-y(6))/4$$

$$ME(F3)=(y(5)+y(6)+y(7)+y(8)-y(1)-y(2)-y(3)-y(4))/4.$$

12. The method of claim 1 wherein the interaction effect of the factorial test with three factors as independent design variables between the three factors is determined according to the following formulas:

$$IE(F1 \times F2)=(y(1)+y(4)+y(5)+y(8)-y(2)-y(3)--y(7))/4$$

$$IE(F1 \times F3)=(y(1)+y(3)+y(6)+y(8)-y(2)-y(4)-y(5)-y(7))/4$$

$$IE(F2 \times F3)=(y(1)+y(2)+y(7)+y(8)-y(3)-y(4)-y(5)-y(7))/4.$$

13. The method of claim 9 wherein y(n) is a value assigned to the responses.

14. The method of claim 12 wherein y(n) is a value assigned to the responses.

15. A data processing expert system for enabling design of a factorial test for a marketing campaign with multiple factors as independent design variables, comprising:
 a server for providing access to a web client:
  to permit a user of the web client to design the factorial test with multiple factors as independent design variables, using an interactive test design process, such that the user designs the factorial test by interacting with the web client, the factorial test including at least a selection of test type, a test population of potential customers of the marketing campaign against which the factorial test is to be run, and selection of at least two factors from the test population of potential customers to be used as independent design variables wherein the factorial test includes testing multiple factors simultaneously;
 an online expert system:
 to execute the factorial test;
 to determine responses by the potential customers of the marketing campaign in the test population to the multiple factors tested simultaneously ; and
 to automatically evaluate factorial test results within the online expert system, using predetermined formulas to calculate at least one of a main effect and interaction effect of the multiple factors.

16. The data processing system of claim 15, wherein the web client further permits the user to:
 choose the multiple factors;
 set factor levels for the multiple factors;
 choose the test population of potential customers of the marketing campaign from among a larger population; and store information specifying the factorial test design in a database.

17. The data processing system of claim 16, wherein the database further comprises:
 a test table, having one record of descriptors per factorial test;
 a factors table, having values for all the factors associated with all of the factorial tests;
 a recipes table with treatments for each treatment subgroup; and
 a test_Customers table that associates treatment subgroups with the test population of potential customers of the marketing campaign.

18. The data processing system of claim 15 wherein the online expert system is further to:
 collect results of the factorial test.

19. The data processing system of claim 15 wherein the online expert system is further to
 report the main effects and interaction effects.

20. The integrated data processing system of claim 16 wherein the web client further permits the user to choose factors, set factor levels, choose a test population of potential customers of the marketing campaign, and choose composition of the test population of potential customers of the marketing campaign.

* * * * *

UNITED STATES PATENT AND TRADEMARK OFFICE
CERTIFICATE OF CORRECTION

PATENT NO.         : 8,375,254 B2                                           Page 1 of 1
APPLICATION NO.    : 11/517174
DATED              : February 12, 2013
INVENTOR(S)        : Klein et al.

It is certified that error appears in the above-identified patent and that said Letters Patent is hereby corrected as shown below:

Col. 1, line 7 should read: "Sep. 7, 2006 and 11/517,~~180~~175 entitled "Online Direct Market-"

Col. 7, line 29 should read: "in F3 is measured by ~~is~~ the difference between these two"

Col. 8, lines 53-54 should read: "$ME(F3)=(y(5)+y(6)+y(7)+y(8)-y(1)-y(2)-y(3)$~~31~~$-y(4))/4$."

Signed and Sealed this
Second Day of April, 2013

Teresa Stanek Rea
*Acting Director of the United States Patent and Trademark Office*